April 7. 1964   C. D. MASTRUD, JR   3,128,022
CARRIER FOR ELECTRIC TOOLS
Filed March 1, 1961   2 Sheets-Sheet 1
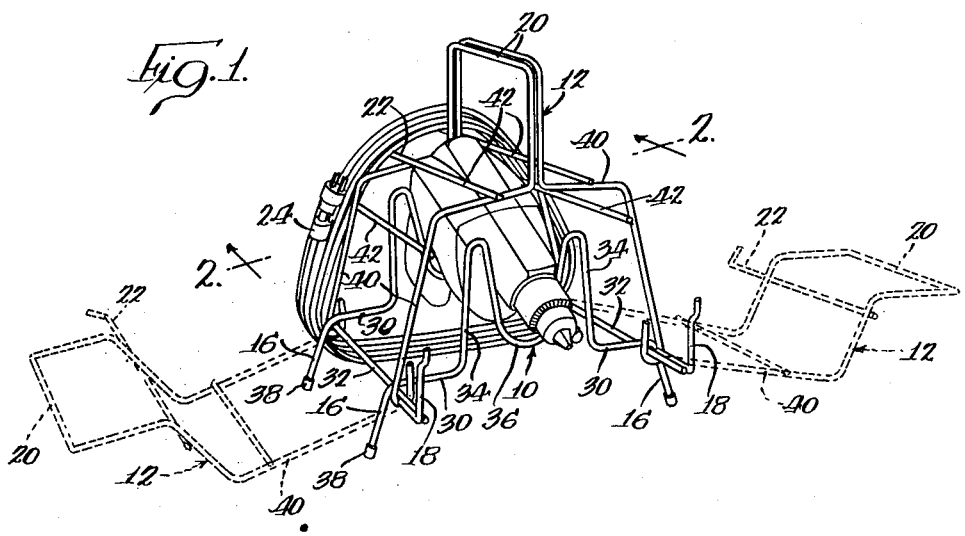
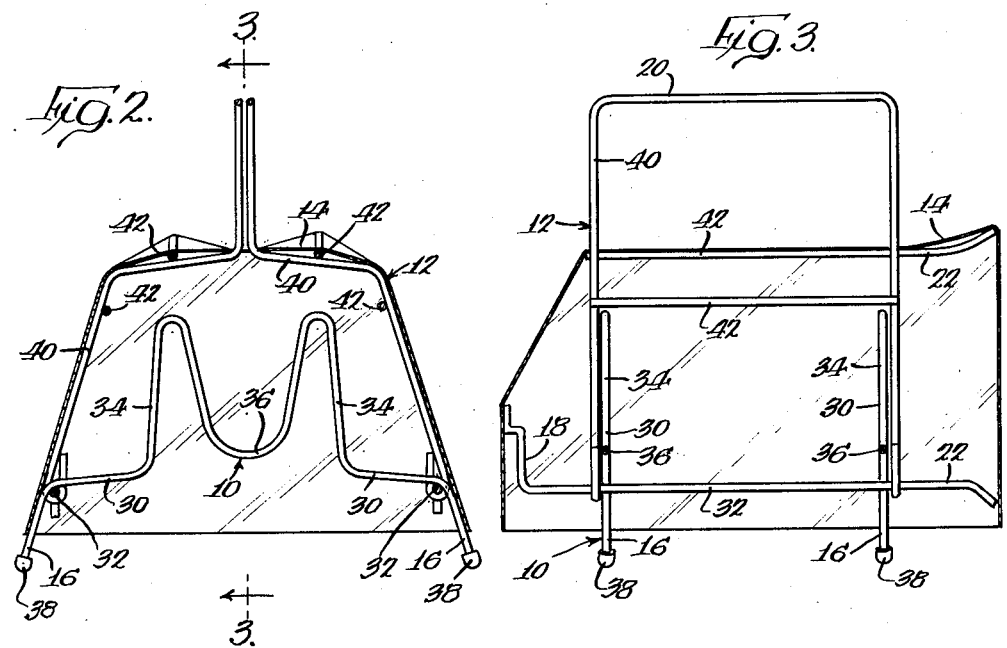
INVENTOR:
Conrad D. Mastrud, Jr.
BY
Gary, Desmond & Parker
Attys April 7, 1964 C. D. MASTRUD, JR 3,128,022
CARRIER FOR ELECTRIC TOOLS
Filed March 1, 1961 2 Sheets-Sheet 2
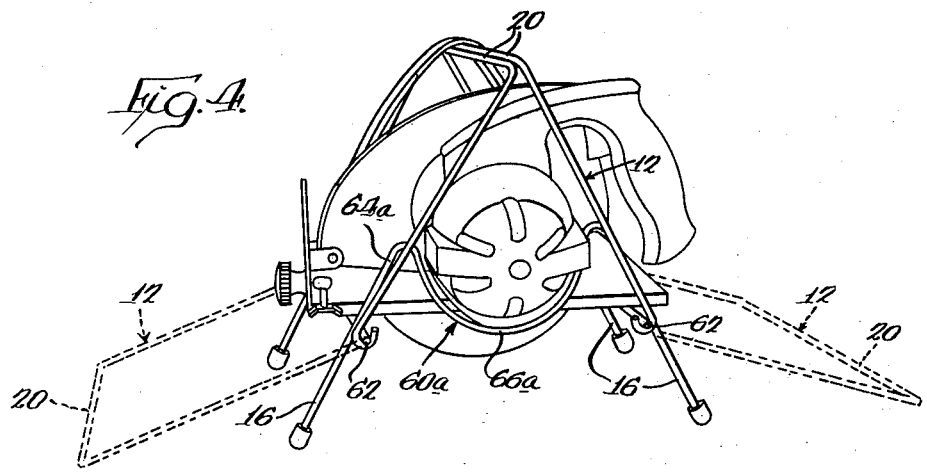
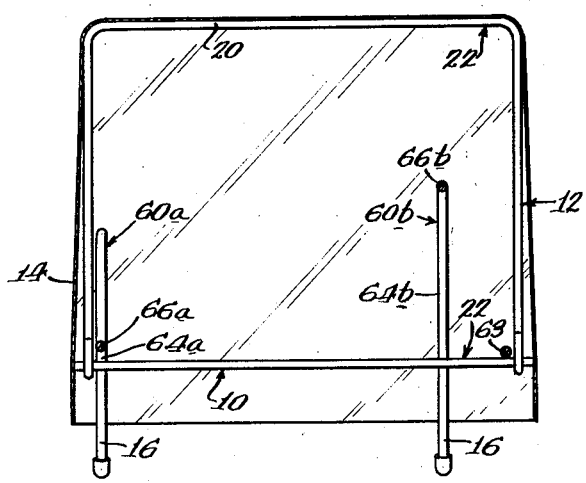
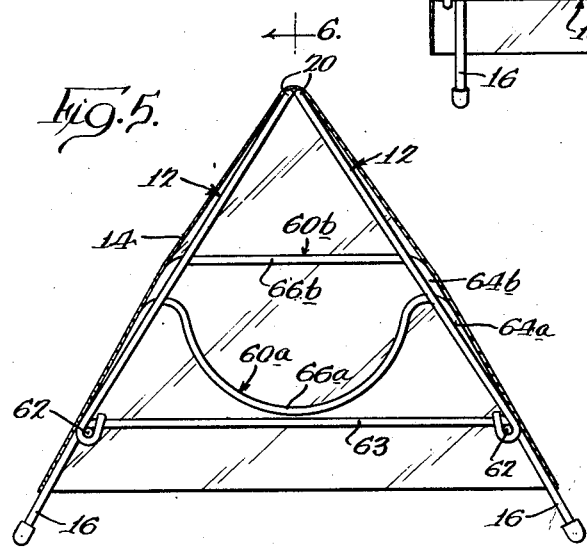
INVENTOR:
Conrad D. Mastrud, Jr.
BY
Gary, Desmond & Parker
Attys

United States Patent Office 3,128,022
Patented Apr. 7, 1964

3,128,022
CARRIER FOR ELECTRIC TOOLS
Conrad D. Mastrud, Jr., 2921 Sheridan Road,
Evanston, Ill.
Filed Mar. 1, 1961, Ser. No. 92,489
1 Claim. (Cl. 224—45)

The present invention relates to carrying and storing means for portable electric tools.

Heretofore, metal or wooden boxes have been the only commercially available carrying cases for portable electric hand tools, such as electric hand drills, saws, sanders, etc. These boxes have been of conventional tool box construction, comprising a relatively deep main box portion or body, a lid or cover hinged to the box body, one or more hasps or latches for locking the cover to the box body, and a carrying handle mounted centrally on the cover. Quite obviously, the cost of such cases is high; so high that the cases are sold as a completely separate item and are purchased essentially only by professional carpenters and craftsmen who must carry their tools from job-to-job. The hobbyist and home craftsman usually do not have a storage case, and their tools are thus subject to mishandling and abuse due to lack of adequate storage facilities.

The object of the present invention is to provide an improved storing and carrying case for portable electric tools that is of such economical construction as to be readily within the means of every owner of hand-held power tools, and in fact, to be of such economy that tool manufacturers may include the case as part of the purchase price of the tools.

Another object of the invention is to provide improved carrying and storing means for electric hand tools comprising, simply, a base for conforable reception of the lower surface portions of the tool, handle means movably associated with the base for overlying the base and encompassing the upper surface portions of the tool, and a removable cover for overlying the base, the handle means and the tool for shielding the same from dust, dirt, etc.

An additional and more specific object of the invention is the provision of carrying and storing means as above defined wherein the base and handle means are comprised of relatively rigid yet highly economical components so constructed as to protectively encompass the tool for prevention of physical damage, and wherein the cover comprises an economical, pliable sheet material.

A further object of the invention is the provision of improved tool carrying and storing means wherein the power supply cord of the tool is employed as a means for physically locking the base and handle means in encompassing relation to the tool.

A still further object of the invention is the provision of an improved carrier for electric tools comprising a base having an upper surface generally complemental to surface portions of the tool for conformable reception of the tool, and handle means movably connected to said base adjacent marginal portions thereof, said handle means having surface portions generally complemental to opposite surface portions of the tool, said handle means being movable from outwardly of said base into overlying relation to said base for encompassing the tool between said base and said handle means, said base and said handle means along marginal portions thereof other than said first-named marginal portions including outwardly exposed portions about which the cord of the tool may be wound to secure the handle means and the base together in encompassing relation to the tool.

More specifically, it is an object of this invention to provide an improved carrier for electric tools comprising a base having an upper surface generally complemental to the lower surface of the tool for conformable reception of the tool, and a pair of handles pivotally connected to opposite sides of said base, said handles each including a hand grip and surface portions generally complemental to opposite upper surface portions of the tool, said handles being movable from positions outwardly of said base to positions overlying said base for encompassing the tool, said hand grips in the latter position of said handles abutting against one another centrally above said base and the tool, said base and each of said handles at corresponding ends thereof transverse to said sides of said base including outwardly exposed portions or projections about which the cord of the tool may be wound to secure the handles and the base together in encompassing relation to the tool.

Other objects and advantages of the invention will become apparent in the following detailed description.

Now, in order to acquaint those skilled in the art with the manner of making and using my improved tool carrying and storing means, I shall describe, in connection with the accompanying drawings, preferred embodiments of the tool carrier and preferred manners of making and using the same.

In the drawings, wherein like reference numerals indicate like parts:

FIGURE 1 is a perspective view of one embodiment of the tool carrying and storing means of the invention especially adapted for electric drills;

FIGURE 2 is a vertical cross-section of the carrier of FIGURE 1;

FIGURE 3 is a vertical longitudinal sectional view of the carrier of FIGURE 1;

FIGURE 4 is a view similar to FIGURE 1 of a second embodiment of my improved carrier especially adapted for electric hand saws;

FIGURE 5 is an end elevation of the carrier of FIGURE 4; and

FIGURE 6 is a longitudinal sectional view of the carrier of FIGURE 4.

Referring now to the drawings, the preferred embodiments of my improved tool carrier are shown as comprising, simply, a base 10, a pair of handles 12, and a removable cover 14. The base and handles are preferably constructed in skeletal form from relatively stiff, durable wire; and the handles are preferably pivotally mounted on the base simply by bending portions of the handle forming wires about certain of the base forming wires. In its preferred embodiment, the cover 14 is formed in any conventional manner of inexpensive pliable sheet material, such as polyethylene, and is simply conformed, essentially, to the side, end and top surfaces of the tool and the carrier (in its closed position) to serve as a dust cover for the tool. The base 10 preferably includes feet 16 to rest the carrier in upright position on the ground or a workbench, and may also include forwardly projecting hooks 18 or the like facilitating mounting of the carrier on perforated wallboard of the type that is widely used in home workshops.

The upper surface of the base 10 is conformed generally to surface portions of the tool to be carried thereby, whereby the tool may be conformably received within the base. Usually, the base will be conformed to lower surface portions of the tool so that the tool may be placed into the base in upright position with its center of gravity disposed generally centrally of the base.

The handles 12 are preferably identical, except that they are of opposite hand, and the same are pivotally connected to the base adjacent the opposite sides and adjacent the lower extremities of the base. The handles each extend upwardly and inwardly over the base and meet substantially centrally above the base, the inwardly and downwardly facing surfaces of the handles being conformed generally to outwardly and upwardly facing surface portions of the tool to be carried, whereby the handles encompass the tool and confine the same within the base. At the portions thereof centrally above the base, the handles include hand grip portions 20 which abut against one another in the closed positions of the handles, whereby a user may grasp the two handles and thereby carry the carrier and the tool substantially centrally above the center of gravity of the tool.

Additionally, the case and handles are configured to form a skeletal framework about the tool which serves to protect the tool from damage should the carrier be dropped, accidentally struck, or handled in an abusive manner.

For the purpose of securing the base and the handles in protective encompassing relation to the tool, I provide each with cord storing means and utilize the power supply cord of the tool as carrier locking means. Specifically, at an end of the base transverse to the pivotal axes of the handles and at the corresponding end portions of the handles, I provide longitudinally projecting cord storing portions 22, there being at least one such portion on each of the handles and the base. I then tightly wrap the power supply cord of the tool about these portions, thereby to secure the same in their described protective positions. Suitably, the cord may be provided adjacent its plug end with a conventional cord clip 24, permitting attachment of the end of the cord to a previous wrap of the cord for holding the cord in its stored condition.

The cover 14 then slips over the top of the handles, the base, the tool and the stored cord to prevent accumulation of dust and dirt on the tool. Since the skeletal frame protects the tool from physical damage, all that is required is a dust cover, and the element 14 adequately, and inexpensively, serves this purpose. To facilitate carrying of the covered tool, the cover 14 is preferably slotted for passage of the hand grips 20, whereby the cover aids in retaining the handles in closed position.

The above numbered elements are common to the preferred embodiments of my improved carrier, irrespective of the type of tool to be carried, and the same have therefore been so referenced in all of the figures. Considering now the details of each illustrated embodiment, reference is first made to FIGURES 1 to 3 wherein I have disclosed a carrier for an electric hand drill. In this structure, the base 10 is comprised essentially of four wires, namely a pair of end frames 30 and a pair of longitudinal struts 32. The frames 30 are essentially the same, each being formed of a single length of wire and comprising a pair of laterally spaced feet or legs previously identified by the numeral 16, body portions 34 extending upwardly from the legs and a central portion 36 joining the body portions and conformed to the lower surface of a predetermined part of the drill for conformable reception therein of said part. In this case, the portion 36 of one frame 30 comprises a deeply bellied concave recess for reception of the body or motor portion of the tool, and the portion 36 of the other frame comprises a relatively shallow concave recess for reception of the chuck portion of the drill. Consequently, the drill will be received within the base frames, supported therein by the concave portions 36, and protected against damage by the frame body portion 34. To insure full protection of the drill, the body portions 34 preferably extend substantially the full height of the drill body, and the legs 16 extend sufficiently far downward to project below the hand grip of the drill. Thus, the lower ends of the legs, which may as indicated be provided with cushioning pads 38, serve as feet for supporting the carrier and the drill on the ground or on a workbench with the drill spaced upwardly from the supporting surface.

The struts 32 are welded or otherwise secured to the frames 30 above their lower extremities and outwardly of their tool receiving portions, and serve to hold the frames in parallel aligned relation at a predetermined spacing correlated to the body of the drill. In addition, the struts extend beyond both of the frames to serve additional functions. Specifically, the two struts, which are identical, each include a longitudinal body portion extending between the two frames 30, a forward or chuck end portion, previously indicated by the numeral 18, which projects forwardly from the chuck supporting frame 30 to a position forwardly of the outer end of the chuck, then upwardly, forwardly and again upwardly, and a rearward or hand grip end portion, previously indicated by the numeral 22, projecting rearwardly from the body supporting frame 30 beyond the hand grip of the drill and inclined downwardly at its rearward end. The function of the portions 18 is to accommodate mounting of the base 10 on perforated wallboard, one brand of which is "Peg Board," of the type that has found such wide acceptance in home workshops. The portions 18 are configured in the manner conventional for "Peg Board" hooks, whereby the base may be sustained in horizontally projecting position on a wall to serve as a readily accessible storage rack for a drill in a hobby or home workshop.

The handles 12 of the carrier as previously stated, are of identical construction but opposite hand. Each is suitably formed of three pieces of wire, namely a main wire or body 40 and a pair of longitudinal struts 42. The body is essentially of inverted U-shape as viewed in side elevation and includes, in the position illustrated, an upper bight portion comprising a hand grip 20, and a pair of legs which extend generally horizontally from the hand grip outwardly of the body portions 34 of the base and outwardly of the drill and then at a downward and outward inclination to the strut 32 at the respective side of the base. At their lower ends, the legs of the handle body are bent or wrapped about the respective strut 32, thereby pivotally to mount the handle on the base adjacent the side and adjacent the lower extremity of the base. Preferably, the handle is of a length to just straddle the base frames 30, whereby the handle is retained against longitudinal movement relative to the base. Consequently, the handles are mounted on the base for pivotal movement from respective positions laterally outward of the base to positions overlying the base and the tool. For an electric drill as shown, the horizontal portions of the handles in the latter or closed position thereof afford adequate conformation to the upper surfaces of the tool to confine the tool in the base, or in other words, to encompass the drill with a protective skeletal framework. In the closed positions of the handles, the hand grips 20 thereof are abutted against one another centrally above the longitudinal axis of the drill, whereby the two hand grips may be grasped manually to facilitate carrying of the tool in a perfectly balanced relationship.

The struts 42 are welded or otherwise secured to the legs of the body 40 in vertically spaced relation outwardly of the base and the drill. If desired, each strut may include an integral rearward projection 22 extending rearwardly beyond the hand grip of the drill, but in any event at least one strut on each handle includes such projection, preferably the upper one of the struts as herein shown. The projections 22 on the handle are inclined upwardly at their rearward ends and together with the projections 22 on the base 10 constitute four spokes defining a reel surface about which the electric supply cord of the tool may be wrapped. The cord, which projects from the hand grip of the drill, may thus be wrapped or wound about the four projections, and as this is done the two handles are interlocked with one another and the base to secure the skeletal frame in protective encompassing relation about the drill. After the cord is wound on the projections 22, the plug end thereof may be tucked under a prior wrap or winding, or the clip 24 may be clipped onto a prior wrap, thereby to secure the cord to the frame in frame locking position.

The cover 14, as previously explained, completes the assembly. As is apparent from FIGURE 2, the legs of the handles and the base are preferably so correlated as to define a truncated pyramid having smooth side and top surfaces thereby facilitating manufacture of the cover to a form complemental to the frame. The side and top surfaces of the cover are imperforate, except that the top is slotted to permit conformable passage therethrough of the hand grips 20, whereby the cover also serves to hold the handles in tool encompassing relation. The cover is of a length to extend from the forward surface portion of the handle rearwardly over the projections 22, thereby to cover the tool per se and its cord. The rear wall of the cover is preferably imperforate, and the front wall is also, except for slots in the lower edge portion thereof accommodating passage of the hooks 18.

The carrying and storing means thus provided by the invention for electric drills is of exceptional simplicity and economical manufacture. Yet, it provides complete protection for the drill as is clearly revealed in FIGURE 1. Also as shown in this figure, the drill is so supported in an inclined or canted position (achieved by suitable configuration of the end supports 30) that the center of gravity of the tool is located substantially centrally of the carrier and the hand grips. To remove the drill from its carrier, it is only necessary to slip off the cover 14, unwind the cord from the projections 22, swing the handles from their closed (solid line) positions to their open (dotted line) positions, and lift the drill out of the base.

Referring now to FIGURES 4 to 6, the carrying and storing means I provide for electric saws is comprised of essentially the same elements and embodies the same concepts as above described. Specifically, the base 10 is comprised of five wires, namely, a pair of end frames or supports 60a and 60b, a pair of longitudinal struts 62 and a transverse bracing strut 63 at one end of the longitudinal struts. In this embodiment of the invention, one end frame 60a is configured like the above described frames 30 to support the saw, the other end frame 60b is simply a confining member, and the struts 62 are tool-supporting elements. Specifically, the one end frame 60a is formed of single length of wire comprising a pair of laterally spaced feet or legs 16, body portion 64a extending upwardly from the legs and a central, bellied portion 66a joining the body portions and conformed to the lower surface of the motor of the saw. The other end frame 60b likewise is formed from a single length of wire and comprises a pair of laterally spaced feet or legs 16, a pair of body portions 64b and a straight or bight portion 66b joining the body portions at their upper ends, thereby to define an inverted U adapted to abut against the end face of the saw blade guide.

The struts 62 are welded or otherwise secured to the body portions 64a and 64b of the frames 60a and 60b in a common horizontal plane above the lower extremities of the frames to hold the frames in parallel aligned relation at a predetermined spacing correlated to the saw, and in addition, to provide horizontal support bars for the table or base of the saw, thereby to support the saw in the base. If desired, the struts 62 could extend beyond the frame 60a and be formed to define "pegboard" hooks like the hooks 18 previously described. At their opposite ends, the struts extend beyond the frame 60b, thereby to define cord receiving projections or portions 22. At this end of the frame, the projections 22 are rigidified by the transverse strut or brace 63, which is welded or otherwise secured to the struts 62 adjacent their outer ends.

The handles 12 in this embodiment of the invention are comprised simply of inverted U-shaped wires, the bight portions of which comprise hand grips 20 and the free or lower ends of the legs of which are bent or wrapped about a respective one of the struts 62, thereby pivotally to mount the handles on opposite sides of and adjacent the lower extremities of the base. Both handles straddle the whole length of the base, i.e., from the outer face of the frame 60a to the outer face of the transverse strut 63, whereby the handles are retained against the relative longitudinal movement. Consequently, the handles are mounted on the base for pivotal movement from respective positions laterally outwardly of the base (dotted lines) to positions overlying the base and the tool (solid lines). In cooperation with a saw, it is adequate simply to have the legs of the handles inclined upwardly and inwardly over the saw body, in which position they are conformed generally to the saw and serve to retain it in the base, especially the portions of the legs overlying the motor of the saw and the hand grips 20. In the closed positions of the handles, the hand grips 20 are abutted against one another centrally above the longitudinal axis of the base and the saw, whereby the two hand grips may be grasped to facilitate carrying of the saw in balanced relationship.

By virtue of extension of the handles 12 over the full length of the base, the hand grips themselves, at the ends thereof adjacent the projecting portions 22 of the struts 62, serve as outwardly exposed cord receiving portions. If desired, the hand grips may be slightly bowed in an inward or downward direction to facilitate retention of a cord, and the projecting portions of the strut 62 may also be bent downwardly at their outer ends. The end portions of the two hand grips and the two struts 62 thus constitute spokes defining a reel surface about which the electric supply cord of the saw may be wrapped. The cord may thus be wrapped or wound about the four projecting or exposed portions, and as this is done, the two handles are interlocked with one another and the base to secure the skeletal frame in protective encompassing relation about the saw.

The cover 14, in the embodiment of FIGURES 4 to 6, is conformed to the carrier (in its closed position), and the saw, the same comprising essentially at tent-like structure of pliable plastic sheet material having straight imperforate end walls and inclined front and rear walls having slots adjacent their juncture to facilitate passage of the user's hands through the slots and under the hand grips. Due to the triangular relationship of the handles 12 in their closed positions, and the corresponding triangular cross-section of the cover 14, the cover assists in retaining the handles closed and protects the saw from dust, etc.

Thus, the invention provides an extremely simple and economical carrying and storing case for portable electric saws which fully protects the saw from damage and facilitate its transport from place to place.

From the foregoing, it is believed apparent that all of the objects and advantages of the invention have now been shown to be attained in a convenient, economical and practical manner.

While I have shown and described what I regard to be the preferred embodiments of my invention, it will be appreicated that various changes, rearrangements and modifications may be made therein without departing from the scope of the invention, as defined by the appended claims.

I claim:

A carrier for a portable electric tool having a power supply cord, comprising a generally rectangular base formed of integrally united wires, said wires being shaped to form a pair of longitudinally spaced upwardly extending wire elements, the upper surface portions of which are conformed generally to lower surface portions of the tool for conformable reception of the tool, said wire elements including upwardly extending portions opposed to one another longitudinally and transversely of the base complemental to oppositely facing vertical surfaces of the tool for retaining the tool against movement relative to the base in the horizontal direction, a pair of wire bails pivotally connected to opposite sides of said base, said bails each including surface portions conformed generally to upper surface portions of the tool which normally overly the base for encompassing the tool, said bails each including a hand grip spaced upwardly from the tool and abutting against one another centrally above the tool when the bails encompass the tool, and outwardly projecting portions on each of said bails and said base at one end of the base transverse to the pivot axes of said bails about which the cord of the tool may be wound to secure the bails and the base together in encompassing relation to the tool, said bails upon removal of the cord from said outwardly extending portions being pivotally movable to positions outwardly of the base to accommodate removal of the tool.

References Cited in the file of this patent

UNITED STATES PATENTS

| | | |
|---|---|---|
| 1,453,942 | Mills | May 1, 1923 |
| 1,495,548 | Cline | May 27, 1924 |
| 1,728,521 | Anderson | Sept. 17, 1929 |
| 2,954,898 | Freeberg | Oct. 4, 1960 |
| 2,985,348 | Terman | May 23, 1961 |
| 3,014,597 | McWherter | Dec. 26, 1961 |